(12) United States Patent
Heibel

(10) Patent No.: US 7,661,891 B2
(45) Date of Patent: Feb. 16, 2010

(54) DIRECTING BASE FOR CAMERA MOUNT

(76) Inventor: Thomas S. Heibel, 4870 S. Delaware St., Englewood, CO (US) 80110

( * ) Notice: Subject to any disclaimer, the term of this patent is extended or adjusted under 35 U.S.C. 154(b) by 309 days.

(21) Appl. No.: 11/746,053

(22) Filed: May 8, 2007

(65) Prior Publication Data

US 2008/0277540 A1  Nov. 13, 2008

(51) Int. Cl.
*G03B 17/56* (2006.01)
(52) U.S. Cl. ............... 396/428; 348/373; 248/187.1; 403/171
(58) Field of Classification Search ............ 396/422, 396/428; 348/373; 248/187.1, 177.1; 403/171
See application file for complete search history.

(56) References Cited

U.S. PATENT DOCUMENTS

| | | | | |
|---|---|---|---|---|
| 3,632,147 A | * | 1/1972 | Finger | 403/171 |
| 5,051,019 A | * | 9/1991 | Kohl | 403/171 |
| 5,246,193 A | | 9/1993 | Faidley | |
| 5,265,395 A | * | 11/1993 | Lalvani | 52/648.1 |
| 6,702,640 B1 | * | 3/2004 | Park | 446/85 |
| 2002/0110411 A1 | * | 8/2002 | Chen | 403/217 |
| 2003/0165353 A1 | * | 9/2003 | Clausell | 403/56 |
| 2005/0265711 A1 | | 12/2005 | Heibel | |

* cited by examiner

*Primary Examiner*—Christopher E Mahoney
*Assistant Examiner*—Fang-Chi Chang
(74) *Attorney, Agent, or Firm*—Kyle W. Rost

(57) ABSTRACT

A disc shaped, unitary body with a flat top surface mates against a tripod head. An upper side annular surface defines a fanned array of threaded bores on radial axes for receiving and supporting extension rods leading to suction cup fasteners. A lower side surface of frusto-conical contour, converging downwardly, depends from the upper side surface and defines a fanned array of threaded bores on axes angled outwardly and downwardly. A bottom face is a planar ring that defines vertical bores distributed around the ring. A central cavity wall is configured as an upwardly tapering conic frustum, connected at its lower end to an inside edge of the bottom wall. The cavity wall defines a fanned array of threaded bores on axes angled inwardly and downwardly. The top of the cavity wall defines a countersink.

11 Claims, 5 Drawing Sheets

DIRECTING BASE FOR CAMERA MOUNT

BACKGROUND OF INVENTION

1. Field of the Invention

The invention generally relates to supports and to brackets specially mounted or attached by vacuum, including plural mounted vacuum cups.

2. Background Art

Photographers employ a number of devices to assist them in obtaining clear pictures under a variety of circumstances. The handheld camera may be the most versatile, because the photographer can support the camera to the best of his ability regardless of ambient conditions. For example, a photographer can take pictures from a moving car while merely holding the camera by hand. Under such conditions, distant shots such as landscapes might be satisfactory, while close shots might be unclear.

A rigid tripod is a common stability aid. If a tripod rests against a steady support, the camera will tend to be steady and produce a clear picture. Tripods are not entirely helpful in a moving car because the car is subject to vibrations and bouncing movements, which would be transmitted through the rigid tripod to the camera.

Some cameras even at the advanced consumer level include a stability motor, which helps to keep the picture steady despite the use of a high magnification lens. The stability motor is useful in controlling a degree of hand-held shaking. There are more sophisticated and costly systems to stabilize the picture in a moving camera. Some of these are best suited for professional use supported by a crew, such as in producing a professional motion picture. The advanced consumer photographer or even a large portion of professional photographers are unlikely to own or use an elaborate system due to the cost and preparation needed.

U.S. Pat. No. 5,246,193 to Faidley is representative of prior art where a camera mount is somewhat portable but is limited in its versatility by its structures to use in a narrow operational environment. For example, the Faidley camera mount is suited to attach to the inside of a windshield by two suction cups, and an associated brace fits against the windshield to provide a third brace point. Even within the indicated useful environment, it must be noted that cars do not have a standardized windshield configuration. As a result, the configuration of the chosen vehicle may determine whether even such a specialized camera mount will fit.

The stable and versatile camera mount taught in United States Patent Application Publication 2005/0265711 to Heibel addressed the problem of mounting a camera to the varied surface of a vehicle, such as a surface that is curved or somewhat irregular. The Heibel camera mount, which has become known by the trademark Sticky Pod, enabled photographers to take advantage of a moving platform for taking pictures, but without extensively or permanently modifying the car, truck, boat, airplane, or other vehicle. The Sticky Pod mount is mobile, adaptable to a chosen vehicle of almost any description, and can be adapted to support a camera in almost any orientation.

The Sticky Pod camera mount employs a generally planar base plate to carry vacuum cups at broadly separated positions on the bottom face of the base plate. The vacuum cups can anchor the base plate to a carrier vehicle on a surface that ranges in contour from flat to considerable curvature. A camera-mounting stud extends from the top of the base plate to mount a camera. A keeper plate is fastened to a face of the base plate to hold the stud on the base plate by capturing a enlarged head of stud between the keeper plate and base plate. The attachment is extremely rugged, ensuring that the stud can withstand the vibration and speed of a moving vehicle. For example, multiple rivets can be used to secure the keeper plate to the top face of the base plate, reliably sandwiching the stud head against loss. A camera can be mounted directly on the threaded shaft of the stud, and the vacuum cups secure the base plate to a vehicle. Alternatively, elongated extension rods and swivel heads can be interposed between the stud and the camera to remotely position the camera as desired. Flexible tethers connected to the camera can be used to establish three-point stability to reduce camera movement while carrier vehicle is in motion.

Photographers, and especially moviemakers, have used the Sticky Pod in increasingly challenging situations, such as inside moving aircraft—both rotary wing and fixed wing— and on cars, trucks, motor homes, motorcycles, boats, and tanks, even when in motion. It was evident that the Sticky Pod is being used in situations where vastly more technically sophisticated and expensive equipment previously had been required.

It would be desirable to have a camera mount that has increased anchoring ability, such as the ability to be attached on a plurality of surfaces at considerable angles to each other. Perpendicular or other angled surfaces can provide still better camera stability than a mount attached to a more-or-less single surface. Such an improved camera mount could perform under increasingly difficult circumstances and carry a larger and heavier camera.

Similarly, it would be desirable to provide a camera mount with selectively locatable or angled anchoring points, to allow simultaneous anchoring to several different surfaces such as sharply angled surfaces.

To achieve the foregoing and other objects and in accordance with the purpose of the present invention, as embodied and broadly described herein, the method and apparatus of this invention may comprise the following.

SUMMARY OF THE INVENTION

Against the described background, it is therefore a general object of the invention to provide a camera mount that enables a camera to be supported from mounting surfaces at diverse angles to one another. Thus, for example, a camera mount might be supported at the intersection of two planar surfaces, such as at either at an inside angle or at an outside angle of two perpendicular wall surfaces. Further, the mount may be supported from three intersecting surfaces, such as at the corner of three mutually perpendicular walls, which might be either an inside or outside three-sided corner.

An important object is to enable anchoring devices to be selectively located and angled. A versatile mount should be adaptable to mount on intersecting surfaces, providing support from several planes.

Another object is to provide a joining device capable of supporting a plurality of anchoring devices at selected relative angles and distances. A suitable joining device can carry a plurality of anchoring devices, each in a position to adhere to one of several different related surfaces, where the different surfaces may be in sufficiently diverse positions or at angles such that a single anchoring device could not adhere simultaneously to more than one such surface.

An optional object is to combine the anchoring ability of a Heibel Sticky Pod with a joining device supporting a plurality of Heibel Sticky Pods at selected relative positions. The Sticky Pod has a proven ability to adhere to a surface having a degree of irregularity. A suitable joining device can carry a plurality of Sticky Pods, each in a position to adhere to one of several different related surfaces, where the different surfaces may be in sufficiently diverse positions or at angles such that a single Sticky Pod could not adhere simultaneously to more than one such surface.

According to the invention, a directing base for a camera mount provides the ability to anchor the camera mount to plural external surfaces at diverse angles. The directing base is formed of a body defining a generally planar top mating surface for receiving a tripod head. A fanned array of parallel receptors extends parallel to and offset below the top surface. An array of perpendicular receptors extends perpendicular to the top surface. A fanned array of angled receptors extends at a mid-acute angle from the top surface. These various parallel, perpendicular, and angled receptors are suited for attachment to longitudinal rods, to maintain such attached rods in axially aligned positions with the respective receptors. In turn, the rods carry suction cup fasteners and position the fasteners against suitable attachment surfaces to support the camera mount.

The body of the directing base is disc shaped. The top surface is a major planar, disc shaped face. An upper sidewall is disposed perpendicular to the top surface, depends from the periphery of the top surface, and is generally cylindrical. A frusto-conical lower sidewall depends from the lower end of the upper sidewall. The lower sidewall is disposed at a mid-acute angle to the upper sidewall and converges downwardly. A generally planar bottom wall is connected to the lower end of the lower sidewall and is parallel to the top surface. The various receptors of the fanned array of parallel receptors are threaded bores formed in the body through the upper sidewall and arranged on longitudinal radial axes. The various receptors of the array of perpendicular receptors are threaded bores formed in the body through said bottom wall and disposed in a ring. The various receptors of the array of angled receptors are threaded bores formed in the body through said lower sidewall and disposed at a downward and outward angle in a ring.

Optionally, a frusto-conical inward facing central wall is centrally joined to the bottom wall and extends upwardly from the bottom wall at a mid-acute angle with upward convergence. The receptors of the array of angled receptors include threaded bores formed in the body through the central wall and disposed at a downward and inward angle in a ring.

The lower sidewall and central wall define a flat surface region surrounding the mouth of each threaded bores formed in them. The flat region provides a planar contact area for, in use, a rod end that can be engaged with one of the threaded bores.

The accompanying drawings, which are incorporated in and form a part of the specification, illustrate preferred embodiments of the present invention, and together with the description, serve to explain the principles of the invention. In the drawings:

DETAILED DESCRIPTION

Incorporation by Reference: United States Patent Application Publication 2005/0265711 to Heibel, published Dec. 1, 2005, is hereby incorporated by reference. This publication discloses the detailed structure of a camera mount with base plate carrying suction cups and a camera mount stud. In addition, this publication discloses the structure and use of extension rods, swivel rods, washers, and tethers. A preferred embodiment of the present invention employs the same or similar devices to those disclosed in this publication.

The invention is a directing base 10 for a camera mount. A directing base is a body that is adapted to carry a plurality of anchoring devices at positions selected from among an array of available predefined positions arranged at diverse angles and directions. The directing base 10 is particularly suited for use in supporting cameras. The directing base 10 is a component of a camera mounting system. As such, the directing base 10 directly may carry a camera. More commonly, the directing base 10 will carry a tripod head that directly carries a camera. Additionally, the directing base may be combined with a tripod head to form an integrated or unified structure. In the following disclosure, for purposes of description and not limitation, the directing base 10 will be described as a discrete component of a camera mounting system. In addition, for convenience of description and not as a limitation, directional words such as top, bottom, up, and down will be used to describe the directing base in an exemplary orientation relative to vertical or horizontal coordinates. The orientation will be such that a tripod head would be carried above the directing base.

Figure 1:
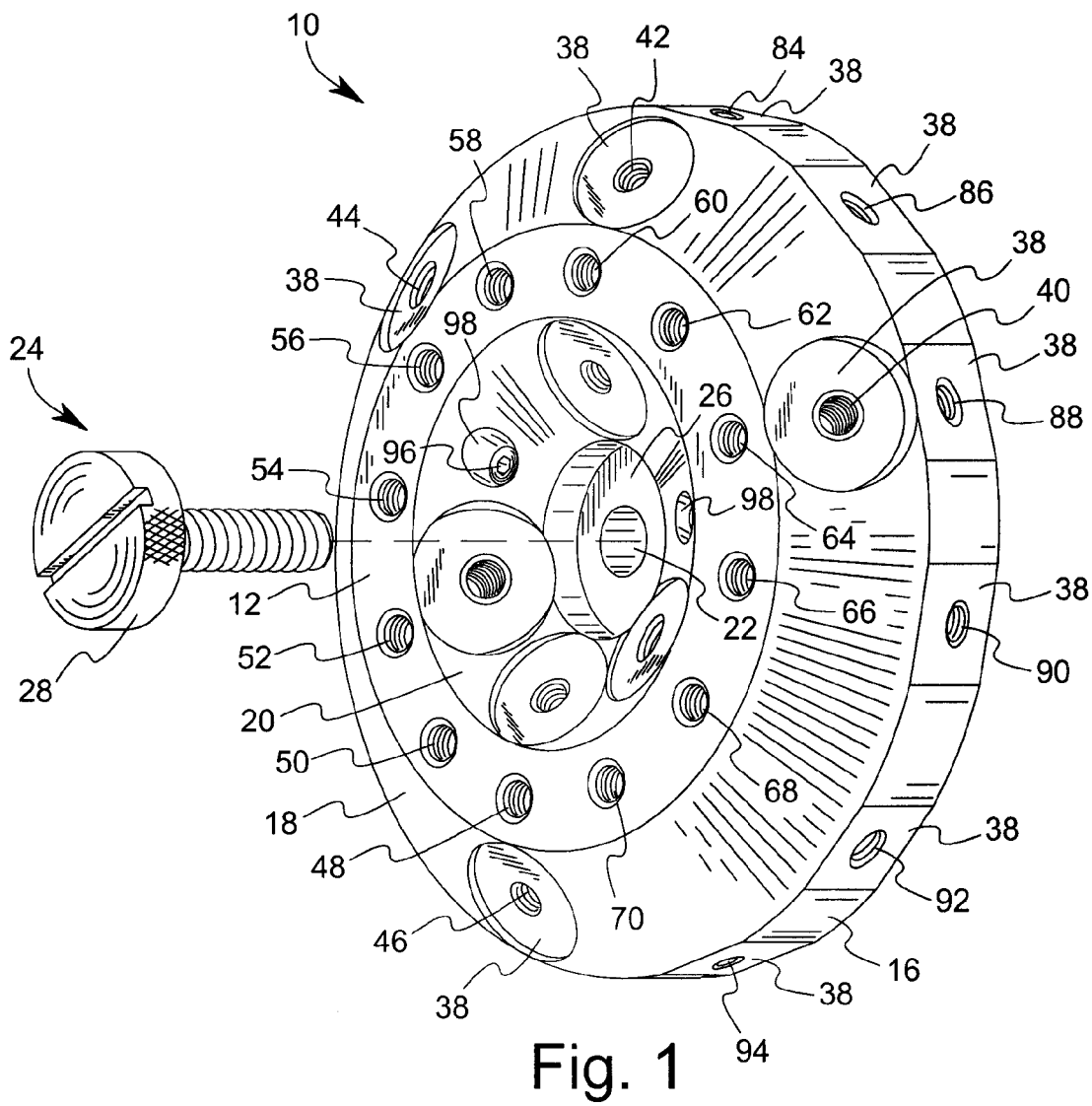
FIG. 1 is an isometric assembly view taken from bottom right of a directing base and tripod head-mounting bolt.
Figure 2:
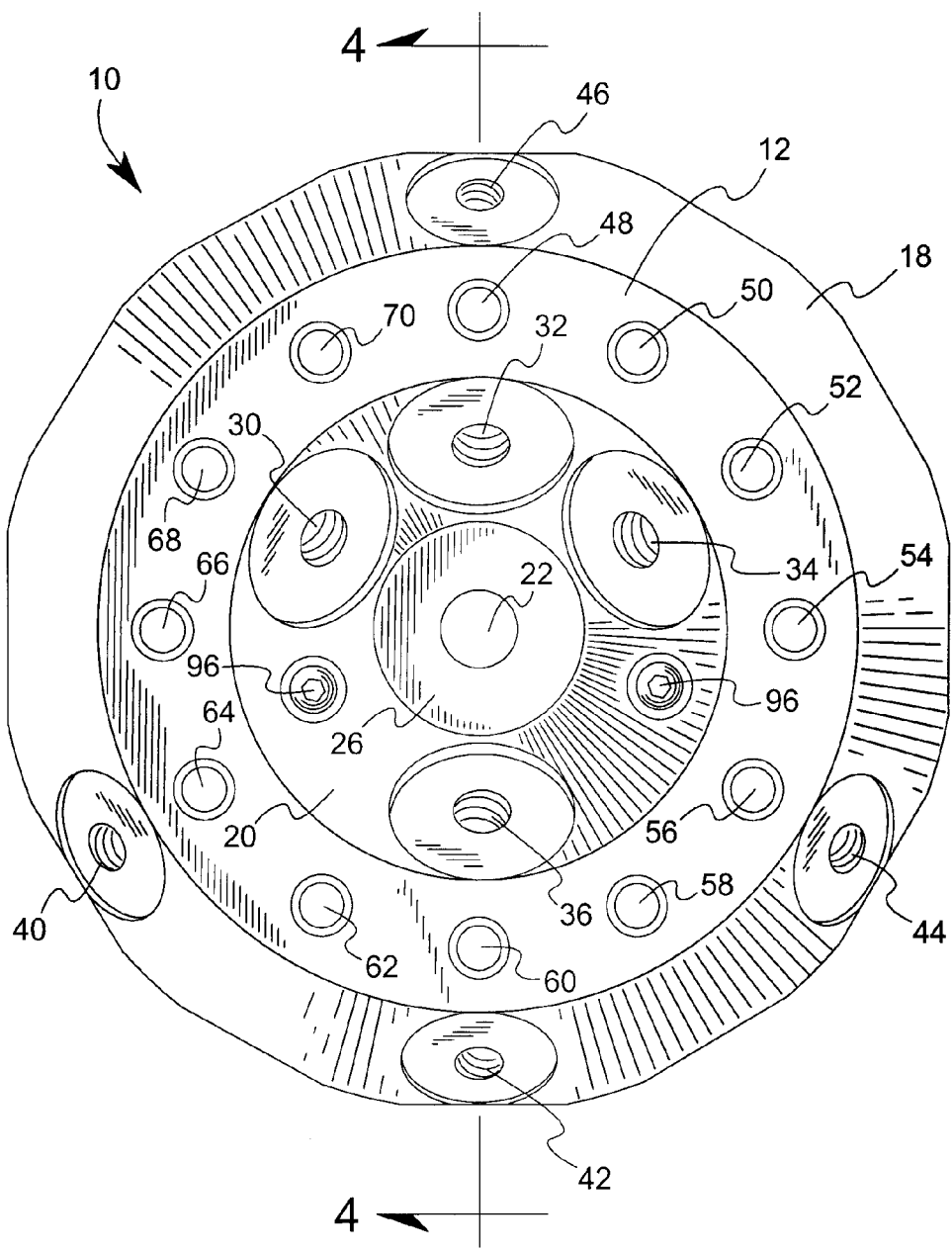
FIG. 2 is a bottom plan view of the directing base of FIG. 1.
Figure 3:
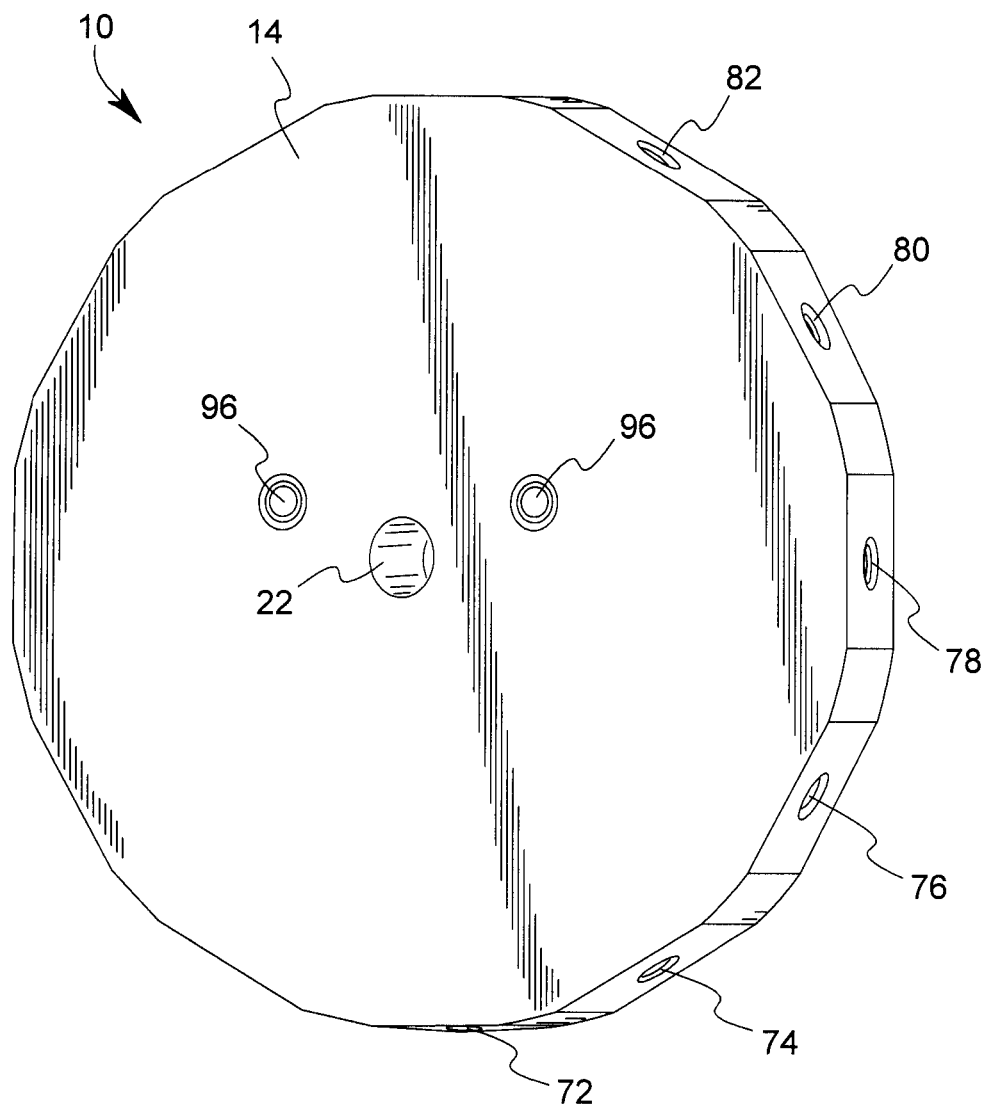
FIG. 3 is a isometric view taken from top right of the directing base of FIG. 1.

With reference to FIGS. 1-3, the directing base 10 is shown to be a generally disc shaped, unitary body of strong material, preferably a durable metal such as aluminum or steel. The body is configured by at least four and preferably five generally identifiable surfaces. A bottom face 12 is a flat, annular surface. A top face 14 is a flat, generally disc shaped surface. The top and bottom surfaces are separated by a height sufficient to accommodate several intermediate surfaces and structures, such as the depth of various bores, described below. One of these intermediate surfaces is an upper sidewall or outside peripheral surface 16 that is generally cylindrical and is joined at one end of the cylinder to the top surface 14. The distance through the center of top surface 14 between opposite sides of peripheral surface 16 generally defines a diameter of the directing base 10. A lower sidewall or intermediate wall is a downwardly tapering outer conic frustum surface 18, which will be referred to as the outer frusto-conical surface 18, interconnects the peripheral surface 16 and the outer edge of bottom surface 12. An upwardly tapering inner conic frustum surface 20, which will be referred to as the inner frusto-conical surface 20, is connected at one edge with the inside edge of bottom surface 12 and defines a frusto-conical upward recess at the bottom center of the base 10.

In addition, as best shown in FIG. 1, a centerline vertical bore 22, which may be a smooth bore, passes through the center of the directing base 10. The bore is sized to receive a mounting fastener 24, which may be a threaded machine screw or bolt suited to attach a tripod head to directing base 10. The upper end of the frusto-conical recess defines a countersink 26 for at least partially receiving the fastener head 28, to remove the head from possible interference with attached anchoring equipment such as mounting rods. The fastener head 28 may be slotted to receive a blade or coin for tightening or loosening the fastener. The countersink is sufficiently deep to establish a clearance from mounting rods. The threaded shaft of the fastener is sufficiently long to extend through center bore 22 and to engage a tripod head to be mounted on top surface 14.

The directing base 10 defines numerous arrays of receptors positioned on the various surfaces to enable anchoring equipment to engage external mounting surfaces at diverse sharp angles to one another. The anchoring equipment often will employ mounting rods, which may be linear rods, swivel rods, or other types of rods. The mounting rods extend between the director base and external mounting surfaces. Specific anchoring equipment will anchor distal ends of the rods to the mounting surfaces. The receptors may be threaded bores in the directing base. Equivalently, the receptors may be threaded studs extending from the directing base. Still other types of fasteners could be used as receptors. For purposes of description and not limitation, the description will refer to the receptors as threaded bores.

When considered from an orientation with top face 14 disposed horizontally, the directing base provides a fanned array of horizontal bores offset below face 14. A fanned array refers to an arrangement distributed through a substantial arc, such as over an arc covering the majority of a circle. The receptors or bores open outwardly, substantially on radially disposed bore axes relative to a circular arrangement. In addition, the directing base provides an array of vertical bores opening downwardly. The vertical bores may be arranged in a ring of smaller diameter than the circle of horizontal bore.

Further, the directing base provides a fanned array of downwardly and outwardly angled bores, positioned below the top surface 14 and opening at a lower, outside end. These bores may be disposed at an acute angle below the horizontal plane of surface 14, preferably in a mid-acute range between forty and fifty degrees and distributed in a circular pattern. As a result, the surface carrying the bores may be an outer conic surface. Terms such as "outward" and "outer" are best understood from the perspective of a circular arrangement, wherein the bores open somewhat away from the center of the circle, such that a linear rod engaged in such a bore would extend outward from the circle without having to pass through or under the center of the circle.

Still further, the directing base optionally provides a fanned array of downwardly and inwardly angled bores, positioned below top surface 14 and opening at a lower, inward end. These bores may be disposed at an acute angle below the horizontal plane of surface 14, preferably at a mid-acute angle between forty and fifty degrees and distributed in a circular pattern. As a result, the surface carrying the bores may be an inner conic surface. Terms such as "inward" and "inner" are best understood from the perspective of a circular arrangement, wherein the bores open somewhat toward the center of the circle. However, due to the conic arrangement, the bore axes also have a downward element that enables an attachment such as a linear rod to be engaged in such a bore and to extend outwardly of the circle after crossing through or under the center of the circle. This surface providing the downward and inwardly angled bores may be considered to be optional because it functions similarly to the surface providing downwardly and outwardly angled bores.

The inner and outer frusto-conical surfaces 18, 20 exemplify surfaces carrying the arrays of downwardly angled bores. Each surface defines similarly arranged arrays of anchor-mounting bores, with the array of surface 18 being rotated by approximately one-half revolution from the array of surface 20. FIG. 2 shows a two-dimensional rendering in which the inner frusto-conical surface 20 defines three inward and downward directed bores 30, 32, and 34 grouped within a one-half arc of the surface 20. The three bores of the group may be referred to as left, center, and right bores, with the left and center bores 30, 32 being juxtaposed and the center and right bores 32, 34 being juxtaposed. The juxtaposed bores 30, 32 and 32, 34 are separated by similar angles of about sixty degrees. The opposite one-half arc of inner frusto-conical surface 20 defines an opposite bore 36 positioned approximately opposite center bore 32. Thus, the opposite bore is separated by an angle of about one hundred twenty degrees from each of the right bore 30 and left bore 34.

A planar area 38 that is perpendicular to the axis of each bore laterally surrounds the mouth of each bore, both on frusto-conical surface 20 and on various other surfaces of directing base 10. The planar area provides a stable contact surface for extension rods, swivel rods, washers, or other devices that may be engaged in the bore. Thus, the size of the planar area 38 is slightly greater than the predetermined size of a rod end or the like that may be part of a system or kit for use with the directing base 10.

As further shown in the view of FIG. 2, the outer frusto-conical surface 18 defines an array of bores similar in number and relative position to the bores of the inner frusto-conical surface 20. The outer surface defines a grouping of three outward and downward directed bores 40, 42, 44 arranged within a single one-half arc of surface 18. Juxtaposed bores 40, 42 and 42, 44 are separated by about sixty degrees. An opposite bore 46 is positioned approximately diametrically opposite from bore 42 and is separated from each of bore 40 and bore 42 by about one hundred twenty degrees. Planar areas 38 as previously described surround bores 40, 42, 44, and 46. The array of bores 40, 42, 44, and 46 is diametrically reversed from the positions of bore 30, 32, 34, and 36. Thus, the group of three bores 30, 32, 34 resides on an arc of surface 18 that is opposite the arc having bores 40, 42, 44. Similarly, the opposite bores 36 and 46 reside on opposite arcs of the surfaces 18, 20. These references to diametric positioning refer only to relative placements on the generally circular directing base 10 but do not refer to coaxial alignments of bore axes. Due to the three-dimensional structure of the directing base 10, the axes of some of the various bores may be parallel and offset from one another.

The bottom planar surface 12 defines a circular array of bores extending perpendicular to the bottom surface 12. Twelve equidistantly spaced bores 48, 50, 52, 54, 56, 58, 60, 62, 64, 66, 68, and 70 are arranged in a ring following the annular bottom surface. These bores are in a series separated from one another by an angle of about thirty degrees. One bore 48 of the ring of bores is disposed between bores 32 and 46. Another bore 60 on the opposite side of the ring from bore 48 is disposed between bores 36 and 42. Because the bottom surface 12 is planar, additional flat areas 38 are not required on bottom surface 12.

The outside peripheral surface 16 defines another circular array of bores, extending radially to the disc shape of the directing base 10. Twelve equidistantly spaced bores 72, 74, 76, 78, 80, 82, 84, 86, 88, 90, 92, and 94 are arranged in a series around the peripheral surface. These bores are separated from one another by an angle of about thirty degrees. One bore 72 of this ring of bores is disposed outside bore 46. Another bore 84 on the opposite side of the ring from bore 72 is disposed outside bore 42. Contiguous with each peripheral bore entrance, the peripheral surface 16 is locally flattened to define a flat contact area 38 as previously described.

Figure 4:
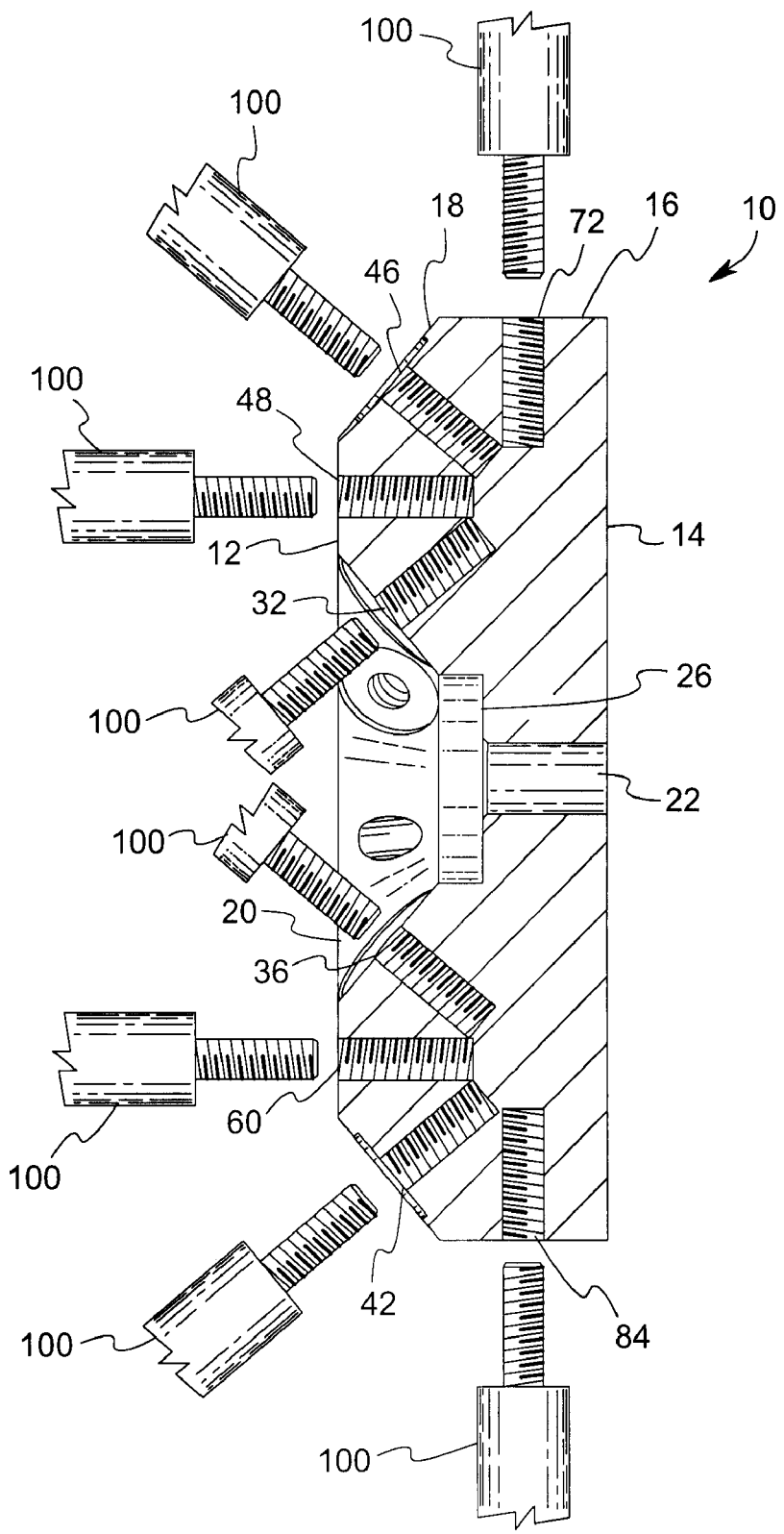
FIG. 4 is a cross-sectional view taken through line 4-4 of FIG. 2, with additionial, broken away rod ends shown in positions to engage various bores in the directing base.

The view of FIG. 4 shows that a transverse diametric plane may bisect directing base 10 and pass through a diametrically arranged series of bores including the center bore 22. A diametric series may include bores 50, 46, 48, 32, 22, 36, 48, 42, and 50. This series of bores follows the primary diametric axis of the directing base. Additional lines of bores follow secondary diametric axes. These include the series of bores 76, 52, 34, 22, 64, 40, and 88, and the series of bores 92, 68, 30, 22, 56, 44, and 80. Tertiary diametric axes include the bores of the outside surface 16 and the bottom surface 12. These follow the series 94, 70, 22, 58, and 82, the series 74, 50, 22, 62, and 86, and the series 78, 54, 22, 66, and 90. Exact alignment of each bore in a transverse plane is not required.

The various bores in each series may be individually offset by a small deviation to one side or the other. Within the disclosed pattern of bores, an offset of up to about five degrees is acceptable for almost any of the threaded bores. For the bores in bottom face 12, which are the sole bores extending in that particular direction, the acceptable deviation is quite large because these bores have minimal interrelationship to any other bores. Accordingly, the directing base 10 may employ other patterns of bores, additional bores, or fewer bores.

FIG. 4 best shows the angular disposition of the outer and inner frusto-conical surfaces 18, 20. From a base line established by bottom planar surface 12, each frusto-conical surface resides at an angle in the range from about forty degrees to about fifty degrees from the bottom surface plane. In a preferred arrangement, the angle is about forty degrees from the bottom surface 12, or about fifty degrees as measured from peripheral surface 16. Each bore follows a longitudinal axis that is substantially perpendicular to the surface that the bore penetrates.

The view of FIG. 4 also shows representative angular relationships between bores of the various arrays. As suggested by the example of peripheral bores 72, 84, the bores on the peripheral surface 16 are arranged in axially aligned pairs on six diameters. As suggested by the example of pairs of bores 46, 36 and 32, 42 on the outer and inner frusto-conical surfaces, each bore on one of the frusto-conical surfaces is parallel to and offset from another bore of the other frusto-conical surface. In addition, these bores in the frusto-conical surfaces are angled at about forty degrees to the planes of the bottom and top surfaces 12, 14. As suggested by the bores 48, 60 on the bottom surface 12, all of the bottom bores are parallel and offset from one another in the ring of the bottom face 12.

The tripod head mount screw 24 is primarily suited to engage a separate tripod head, which would be mounted against the top surface 14 of the directing base. In order to secure a tripod head, the director base includes two additional compression screws 96 located at offset positions from the mount bore 22, forming a triangular pattern. The director base may define threaded bores 98 in the inner frusto-conical surface 20 for carrying the compression screws 96. The positions of the bores 98 are to each side of the bore 36, between bores 36, 30 and 36, 34. The bores include countersink portions for the screw heads. A tripod head can be mounted by engaging the primary mounting screw or bolt 24 into the tripod head through smooth center bore 22, placing bolt 24 in tension to secure the head to surface 14. Then the screws 96 are extended against the tripod head, placing these screws in compression and thereby eliminating any residual looseness in the mounting.

Tripod heads are considered to be an independent accessory of a camera mounting system. Common types include the 3-way pan tilt head, the ball head, the geared head, the panoramic head, and others, selected according to the photographer's preferences or the needs of a particular job. Accordingly, the director base 10 is described independently of any particular tripod head. The director base could be included as a unitary part of a tripod head, and such an inclusion is considered to be within the invention.

Figure 5:
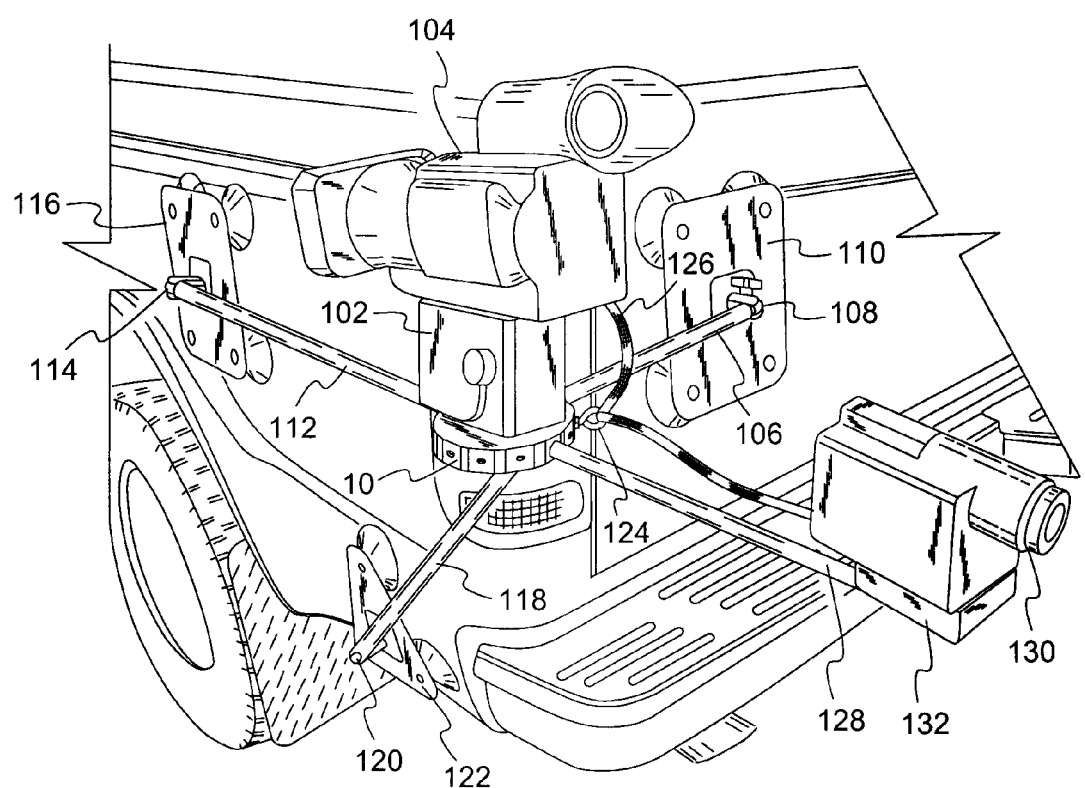
FIG. 5 is an isometric view of the directing base in use with multiple extension rods, ball knuckles, anchoring devices, tripod heads, and cameras, all shown in an exemplary mounting on a left rear corner of a pickup truck box.

In use, the invention allows a camera to be mounted to the director base, such as via an intermediate tripod head. In turn, the director base is anchored to a diverse selection of external surfaces, which may be sharply angled to one another in order to provide a highly stable and secure camera position. FIGS. 4 and 5 suggest the versatility of an anchoring system employing the director base. In particular, FIG. 4 shows ends of mounting rods 100 positioned over a wide variety of angles, enabled by the angles of the threaded bores on the primary diametric axis.

Not all of the bores and all of the rods would be used at one time. Typically, three non-coplanar threaded bores would be used at one time, establishing stable, three-point support. Thus, two bores along any one diameter of the directing base might be used together, but three such bores would not. Despite being arranged along one diameter of the directing base 10, the rods aligned with the bores other than bores 32 and 36 do not interfere with one another. Only one of bores 32 and 36 would be used at one time due to possible interference between mounting rods crossing the centerline of the directing base 10.

Similarly, it is likely that only one of the bores in inner frusto-conical surface 20 would be used at one time, due to possible conflict. However, each of the inner frusto-conical surface bores is backed-up by a parallel, offset bore in the outer frusto-conical surface, enabling two closely spaced parallel mounting rods 100 to be used, if desired. The mounting rods 100 each may be a single rod section or a compound rod formed of more than one rod section, attached together. As previously noted, the countersink 126 is of sufficient depth to remove the fastener head 128 from interference with mounting rods attached to the inner frusto-conical surface 20. To establish the necessary clearance, the countersink can be sized with respect to the extents of planar areas 38 around the threaded bores of the inner frusto-conical surface.

FIG. 5 shows an example of a mounting arrangement employing three-point support on an outside corner of two wall surfaces with complex contour. The selected wall surfaces are a rear corner of a pickup truck box. The directing base 10 carries a tripod head 102 supporting a forward-facing camera 104. Mounting rods are attached to three bores of the directing base 10 for providing support.

A proximal end of rod 106 is mounted in a peripheral bore, which for purposes of example might be bore 78. This rod 106 is joined at its distal end to a swivel rod 108, which is attached to a camera mount 110 of the type disclosed in United States Patent Application Publication 2005/0265711. This camera mount 110 is a type having four suction cups, which are attached to the tailgate of the pickup truck.

A proximal end of rod 112 is mounted in a peripheral bore, which for purposes of example might be bore 84. The distal end of rod 112 is joined to a swivel rod 114, which is attached to a camera mount 116 that is similar to camera mount 110. Camera mount 116 has four suction cups, which are attached to the sidewall of the pickup truck near the rear wheel well.

A proximal end of rod 118 is mounted in a bore of inner frusto-conical surface 20, or equivalently, a bore of outer frusto-conical surface 18. For purposes of example, an appropriate bore might be bore 32 or bore 42. The distal end of rod 118 is joined to a swivel rod 120, which is attached to a camera mount 122. The selected camera mount has three suction cups, which are attached to the lower sidewall of the pickup truck at an under wrapped portion near the rear bumper. Although the three attachments are to only two walls of the pickup truck, the under wrap at the third attachment provides a slightly different plane of attachment. The triangular camera mount 122 is appropriate at this location because it provides relatively more clearance from the extension rod.

It may be appreciated that all of the camera mounts in this example provide multiple suction cups. A total of eleven suction cups secure the directing base to the pickup truck. It would be possible to employ mounting devices other than those disclosed in United States Patent Application Publication 2005/0265711. For example, the distal ends of rods 106, 112, and 118 could be attached to single suction cups, employing intermediate swivel rods 108, 114, and 120, if necessary.

The directing base 10 provides additional versatility and security, as shown by further optional attachments. An eyebolt 124 is mounted in a peripheral bore, which for purposes of example might be bore 74. The eyebolt allows a tether 126 to be secured between the directing base and any convenient external attachment to sell further ensure a firm mount. Another use for the eyebolt and tether is to provide a safety strap between the directing base and camera 104. Another extension rod 128 optionally can carry a second, rear-facing camera 130. The proximal end of extension rod 128 might be mounted to a peripheral bore 72, while the distal end is joined to the camera whether directly, via an intermediate device 132 such as a tripod head, or via a swivel rod, as required.

Thus, the directing base 10 is capable of carrying multiple anchoring devices, multiple cameras, multiple tethers, multiple tripod heads, and such other equipment as may be adaptable. The various arrays of mounting bores enable the directing base to provide three-point support to external objects. The directing base can anchor to inside corners, outside corners, and other contours having sharply angled walls. By way of example and not limitation, mounting surfaces may be arranged at two or three right angles, such as a meeting of two walls or a meeting of two walls and a ceiling or floor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. A directing base for a camera mount, suited for use with mounting rods to direct the mounting rods at selectable angles for anchoring the camera mount to plural external surfaces at diverse angles, comprising:
    a body defining a generally planar top mating surface for receiving a tripod head thereon;
    a fanned array of parallel receptors extending parallel to and offset below said top surface;
    an array of perpendicular receptors extending perpendicular to the top surface; and
    a fanned array of angled receptors extending at a mid-acute angle from the top surface;
    wherein said parallel, perpendicular, and angled receptors are suited for attachment to longitudinal mounting rods and to maintain such attached rods in an axially aligned position with the respective receptors.

2. The directing base of claim 1, wherein:
    said body is disc shaped with at least one major planar, disc shaped face, wherein said major face defines said top surface;
    a generally cylindrical upper sidewall is disposed perpendicular to the top surface and depends therefrom;
    a frusto-conical lower sidewall is disposed at a mid-acute angle to said upper sidewall and depends therefrom with downward convergence;
    a generally planar bottom wall is connected to the lower end of the lower sidewall, is disposed parallel to the top surface, and is separated from the top surface by the height of upper and lower sidewalls;
    said receptors of the fanned array of parallel receptors are threaded bores formed in the body through said upper sidewall and arranged on longitudinal radial axes;
    said receptors of the array of perpendicular receptors are threaded bores formed in the body through said bottom wall and disposed in a ring; and
    said receptors of the array of angled receptors are threaded bores formed in the body through said lower sidewall and disposed at a downward and outward angle in a ring.

3. The directing base of claim 2, further comprising:
    a frusto-conical inward facing central wall, centrally joined to said bottom wall, extending upwardly therefrom at a mid-acute angle with upward convergence; and
    said receptors of the array of angled receptors include threaded bores formed in the body through said central wall and disposed at a downward and inward angle in a ring.

4. The directing base of claim 3, wherein:
    said lower sidewall defines a flat surface region surrounding the mouth of each of said threaded bores formed therein, providing a planar contact area, in use, for a rod end engaged with one of the threaded bores.

5. The directing base of claim 3, wherein:
    said central wall defines a flat surface region surrounding the mouth of each of said threaded bores formed therein, providing a planar contact area for, in use, engaging against an end of a mounting rod engaged with one of the threaded bores.

6. The directing base of claim 5, further comprising:
    a fastener with a head and threaded shaft, suited for engaging a tripod head;
    a countersink formed at a top of said central wall and defining a through-bore to said top surface, wherein said countersink is sized to receive said fastener head and thereby establish clearance from said planar contact areas at the threaded bores of the central wall, and said through-bore is sized to receive said threaded shaft.

7. The directing base of claim 3, further comprising:
    a fastener with a head and threaded shaft, suited for engaging a tripod head;
    a countersink connected to a top of said central wall and forming a through-bore to said top surface, wherein said countersink is sized to receive said fastener head and said through-bore is sized to receive said threaded shaft.

8. A directing base for a camera mount, suited for use with mounting rods to direct the mounting rods at selectable angles for anchoring the camera mount to plural external surfaces at diverse angles, comprising:
    a tripod head mounting fastener with head and threaded shaft;
    a generally disc shaped body configured as:
        a flat top surface for mating against a tripod head;
        an upper side annular surface depending from the periphery of said top surface, and defining a fanned array of threaded bores on radial axes for, in use, receiving and supporting mounting rods;
        a lower side surface having frusto-conical contour, converging downwardly, depending from said upper side surface, defining a fanned array of threaded bores on axes angled outwardly and downwardly;

a bottom face at the lower end of said lower side surface, configured as a planar ring, defining vertical bores distributed around the ring;

a central cavity wall configured as an upwardly tapering conic frustum, connected at its lower end to an inside edge of said bottom wall, defining a fanned array of threaded bores on axes angled inwardly and downwardly, and defining at its upper end a countersink with through bore to the top surface;

wherein said countersink is sized to receive said head of said tripod head mounting fastener.

9. A camera mounting apparatus, comprising:

a directing base having a top surface for mating against a tripod head, a cylindrical sidewall surface oriented perpendicular to the top surface and defining a fanned array of mounting rod attachment points oriented parallel to the top surface, a frusto-conic sidewall surface oriented with downward convergence and defining a fanned array of mounting rod attachment points oriented at a downward mid-acute angle to the top surface, and a planar bottom surface parallel to the top surface and defining an array of mounting rod attachment point oriented perpendicularly downward to the top surface;

means for securing a tripod head to said top surface; and a plurality of mounting rods attached at a proximal end to said directing base at selected mounting rod attachment points.

10. The camera mounting apparatus of claim 9, further comprising:

a plurality of surface engaging anchor devices, attached to a distal end of a plurality of said mounting rods.

11. The camera mounting apparatus of claim 10, wherein said anchoring devices comprise:

a base plate carrying a plurality of suction cups.

\* \* \* \* \*